United States Patent [19]

Matsuoka

[11] 4,179,136

[45] Dec. 18, 1979

[54] SEAT BELT SYSTEM

[75] Inventor: Fumio Matsuoka, Susono, Japan

[73] Assignee: Toyota Jidosha Kogyo Kabushiki Kaisha, Toyota, Japan

[21] Appl. No.: 930,852

[22] Filed: Aug. 3, 1978

Related U.S. Application Data

[62] Division of Ser. No. 796,325, May 12, 1977, Pat. No. 4,124,224.

[30] Foreign Application Priority Data

May 26, 1976 [JP] Japan ................................. 51-61556

[51] Int. Cl.² ........................................... B60R 21/02
[52] U.S. Cl. .................................. 280/744; 280/747; 297/474; 297/483; 280/808
[58] Field of Search ....................... 280/744, 745, 747; 297/388, 389

[56] References Cited

U.S. PATENT DOCUMENTS

| 3,765,701 | 10/1973 | Bowler | 280/745 |
| 3,796,442 | 3/1974 | Mauron | 280/745 |

Primary Examiner—Robert R. Song
Attorney, Agent, or Firm—Koda and Androlia

[57] ABSTRACT

A seat belt system including at least one seat belt which extends from one side of a seat to a point forward of the other side of the seat such that the seat belt extends obliquely forward from one side to the other of the seat, a tongue plate coupled to the seat belt and a buckle provided on the other side of the seat and for engagement with the tongue plate.

5 Claims, 8 Drawing Figures

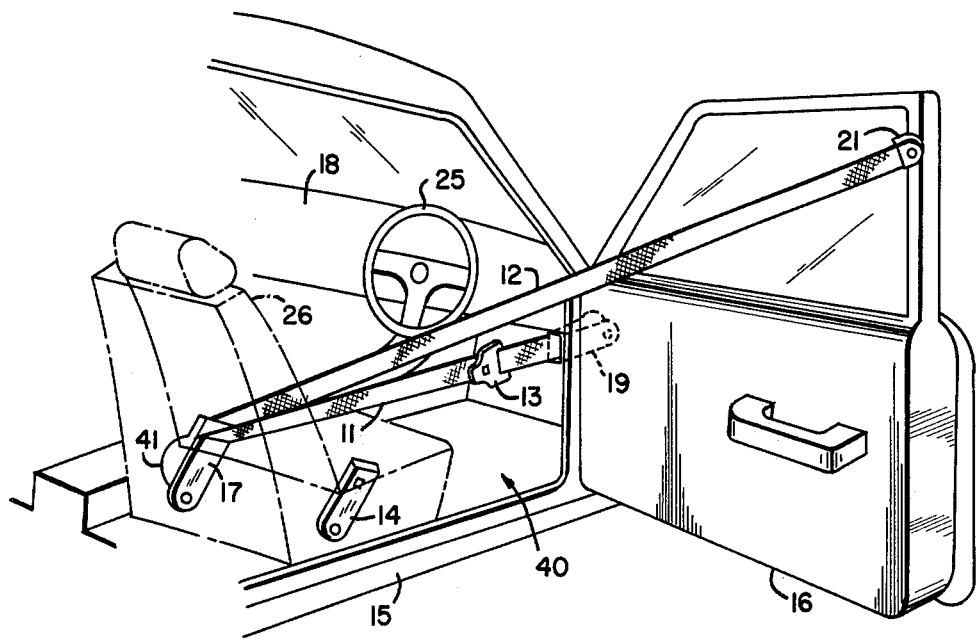
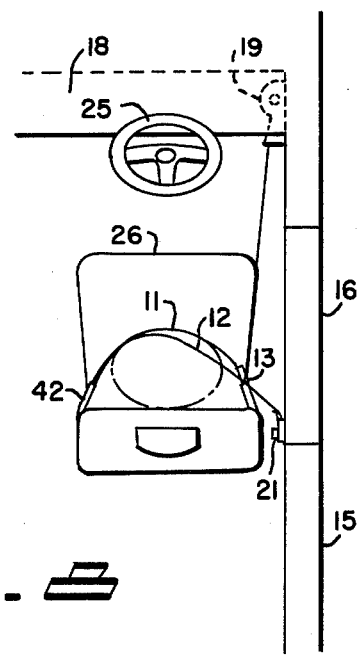

SEAT BELT SYSTEM

This is a division of application Ser. No. 796,325 filed May 12, 1977 now U.S. Pat. No. 4,124,224.

BACKGROUND OF THE INVENTION

1. Field of Invention

This invention relates to seat belt systems which restrain the body of a passenger during vehicle emergencies.

2. Prior Art

Seat belt systems are widely used as restraining devices for the purpose of preserving the safety of vechicle passenger. In many cases, however, the passengers do not use the seat belt system while the vehicle is in motion. Accordingly, such systems have not functioned effectively as passenger restraining devices.

Particularly in Japan, the number of passengers who use seat belt systems is small, i.e., only a few percent. Most vehicle passengers have not put their seat belt systems to use. This is due in part to a lack of appreciation by the passengers of the importance of seat belt systems, and also to the difficulty in handling of conventional seat belt systems.

The present invention has been designed with the above described facts in mind.

SUMMARY OF THE INVENTION

Accordingly, it is a general object of the present invention to provide a seat belt system which can be easily handled.

It is another object of the present invention to provide a seat belt system which prohibits the driving of the vehicle when the system is not in use.

It is still another object of the present invention to provide a seat belt system which is relatively simple and low in cost.

In keeping with the principles of the present invention, the objects are accomplished by a unique seat belt system including at least one seat belt which extends from one side of a seat to a point forward of the other side of the seat such that the seat belt extends obliquely forward from one side to the other of the seat, a tongue plate coupled to the seat belt and a buckle provided on the other side of the seat and for engagement with the tongue plate.

BRIEF DESCRIPTION OF THE DRAWINGS

The above mentioned and other features and objects of the present invention will become more apparent by reference to the following description taken in conjunction with the accompanying drawings, wherein like reference numerals denote like elements, and in which:

FIG. 7 is an oblique view of a third embodiment of a seat belt system in accordance with the teachings of the present invention; and FIG. 8 is a plan view of a modification of the embodiment of FIG. 7 is use;

DETAILED DESCRIPTION OF THE INVENTION

Figure 1:
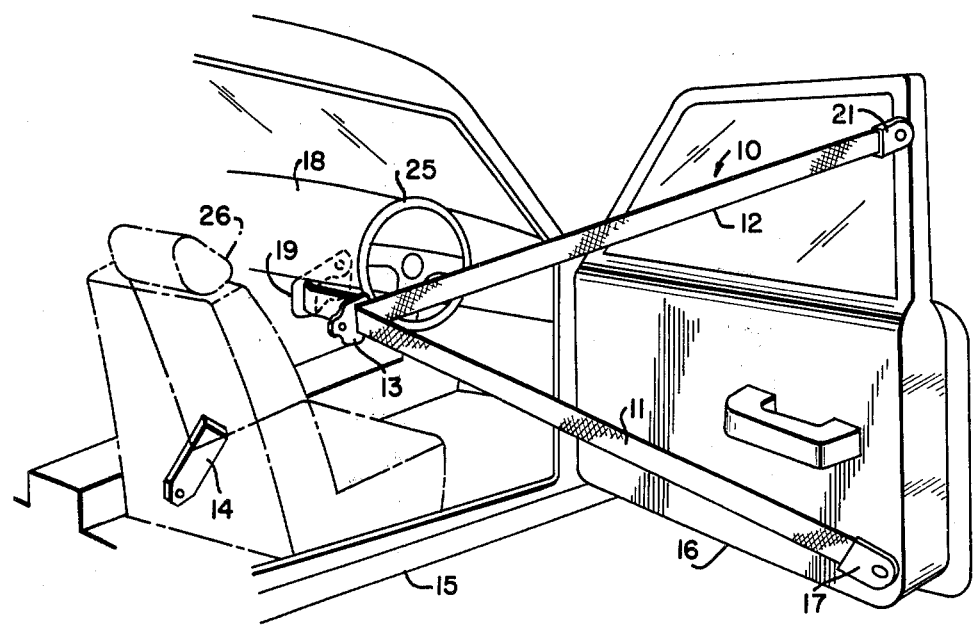
FIG. 1 is an oblique view which illustrates one embodiment of the seat belt system in accordance with the teachings of the present invention.
Figure 2:
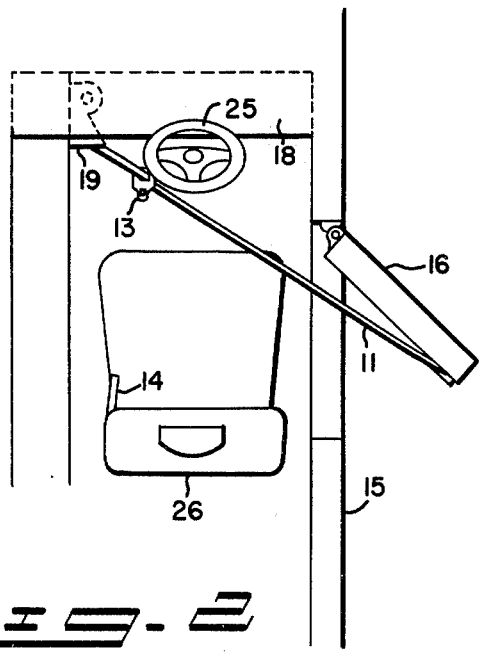
FIG. 2 is a plan view of the embodiment of FIG. 1.

Referring more particularly to the figures, shown in FIGS. 1 and 2 is a first embodiment of a seat belt system in accordance with the teachings of the present invention. In FIGS. 1 and 2, the seat belt system 10 (for use by the driver) consists of a lap belt 11, a shoulder belt 12, a tongue plate 13 and a buckle 14. One end of lap belt 11 is fastened by means of an anchor 17 to the door 16 of a vehicle 15 at a point near the bottom of the opposite side of the door 16 from the hinge. The other end is retracted by a retractor 19 which is fastened near the center line of the vehicle 15 to the bottom of the instrument panel 18 in front of the driver.

The retractor 19 is powered by a coil spring so that it is constantly retracting the lap belt 11. The retractor 19 is also equipped with a mechanism which immediately stops the extension of the lap belt 11 when the vehicle 15 undergoes a given amount of deceleration or when the lap belt 11 is abruptly extended.

One end of shoulder belt 12 is fastened by means of an anchor 21, in the same manner as the lap webbing 11, to the door 16 at a point near the top of the opposite side of the door 16 from the hinge. The other side is retracted along with the lap belt 11 by the retractor 19.

Figure 3:
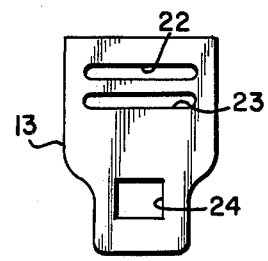
FIG. 3 is a front view of a tongue plate used in the present invention.

As shown in FIG. 3, tongue plate 13 is a thin plate which contains three openings 22, 23 and 24. The openings 22 and 23 are parallel slots through which the shoulder belt 12 and the lap belt 11 are passed so that the tongue plate 13 is free to slide on the belts. As is shown in FIGS. 1 and 2, the tongue plate 13 is located near the steering wheel 25 of the vehicle 15 when the door 16 is opened.

The buckle 14 is anchored to the floor of the vehicle or to the lower side portion of the seat 26 on the opposite side of the seat 26 from the door 16, i.e., on the left side. The buckle 14 is designed so that it can be engaged with tongue plate 13 by means of opening 24 in the tongue plate 13. The buckle 14 is also designed so that it can be easily disengaged by means of a simple action by the passenger.

In operation, when the driver opens the door 16 in order to get into the vehicle 15, the lap belt 11 and the shoulder belt 12 extend from the retractor 19 across the lower portion of the steering wheel 25 and stretched under a given amount of tension by the anchors 17 and 21 located at the edge of door 16.

Since opening the door causes both belts 11 and 12 to be separated from the seat 26 by a considerable distance, the driver can easily get into the vehicle. When the driver closes the door 16 after sitting in the seat, the lap belt 11 is retracted from the lower right side of the seat 26 by the retractor 19 located forward of the opposite side of the seat 26 and the shoulder belt 12 is retracted by the retracter 19 in the same manner as lap belt 11 from the upper door side of the seat 26.

Since both belts 11 and 12 are positioned adjacent the steering wheel 25 of the vehicle 15 when the seat belt system is not in use the driver is not able to operate the vehicle.

If the driver takes the tongue plate 13 in one hand and engages its opening 24 with the buckle 14 while pulling the belts 11 and 12 out of the retractor 19, the lap belt 11 forms a closely adhering loop across the driver's lap from the anchor 17 to the tongue plate 13 engaged with the buckle 14. The lap belt 11 is then folded back through the tongue plate 13 and retracted by the retractor 19. The shoulder belt 12 forms a closely adhering diagonal loop across the driver's chest and after being folded back through tongue plate 13 it is similarly retracted by retractor 19.

Accordingly, the driver is securely fitted within a three point seat belt system so that he can operate the vehicle in safety. Furthermore, since the portions of the belts 11 and 12 between the tongue plate 13 and the retractor 19 are located to one side of the driver near the center line of the vehicle, the belts do not hinder the driver during operation of the vehicle.

Furthermore, when the driver disengages the tongue plate 13 from the buckle 14 and opens the door 16 in order to get out of the vehicle when operation of the vehicle is finished, both belts 11 and 12 again are moved into the position shown in FIGS. 1 and 2 so that the driver can easily get out of the vehicle.

In the above description, the retractor 19 is described as retracting both belts 11 and 12 simultaneously. It is clear, however, that it would also be within the scope of the present invention to install two retractors adjacent to each other so that the belts 11 and 12 are retracted separately. Furthermore, the belts 11 and 12 could also be formed by a single continuous webbing folded back through tongue plate 13, replacing the anchor 17 with a retractor which retracts the lap belt, designing the retractor 19 so that it retracts one end of a wire, and fastening the other end of the wire to the tongue plate 13 so that the tongue plate 13 is retracted in the direction of retractor 19.

Figure 4:
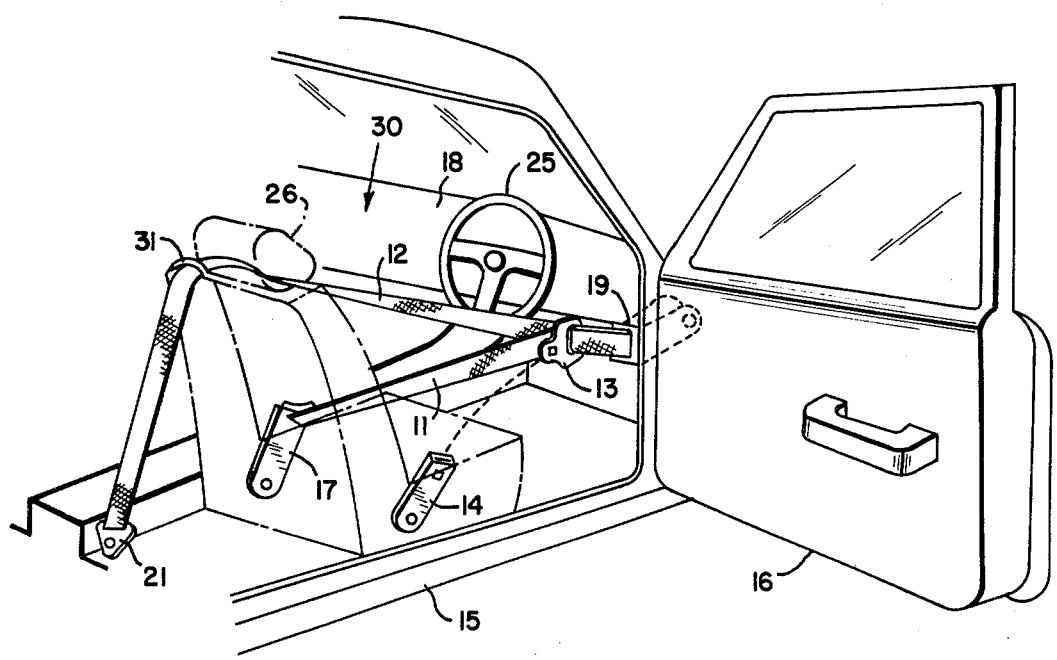
FIG. 4 is an oblique view of a second embodiment of a seat belt system in accordance with the teachings of the present invention.
Figure 5:
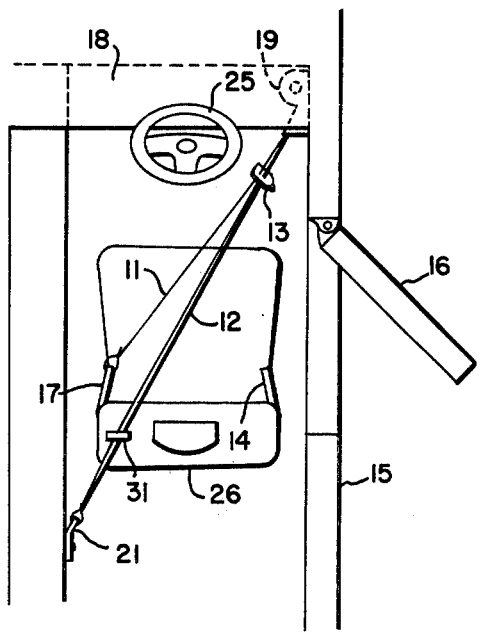
FIG. 5 is a plan view of the embodiment of FIG. 4.

Referring to FIGS. 4 and 5, shown therein is a second embodiment of a seat belt system in accordance with the teachings of the present invention. In FIGS. 4 and 5, the seat belt system 30 consists of substantially the same elements as in the first embodiment but in the second embodiment the retractor 19 is fastened to the bottom of the instrument panel 18 near the side wall of the vehicle. One end of lap belt 11 is retracted by the retractor 19 while the other end is fastened by means of an anchor 17 to the side of the seat 26 near the center line of the vehicle 15, i.e., to the left side of seat 26.

In the meanwhile, one end of shoulder belt 13 is retracted by the retractor 19 in the same manner as the lap webbing 11. The other end is first passed through a guide 31 installed near the side of the seat 26 above anchor 17 and is folded back and anchored to the floor of the vehicle by means of an anchor 21 provided near anchor 17. As in the previously described embodiment, tongue plate 13 is coupled to both belts 11 and 12 at an intermediate point. Buckle 14 is fixed to a lower portion of the seat 26 on the opposite side of seat 26 from anchor 17.

Figure 6:
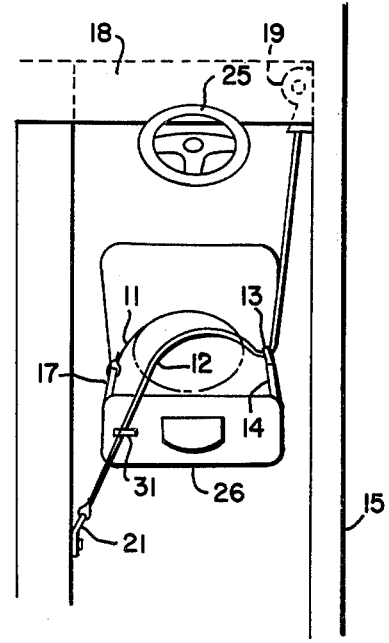
FIG. 6 is a plan view of the embodiment of FIG. 4 in use.

In operation, when the driver engages the tongue plate 13 with the buckle 14 after sitting in the seat, the lap belt 11 extends from retractor 19 in the direction of anchor 17 located at the lower left side of seat 26 and folds back through the tongue plate 13. Similarly, the shoulder belt 12 extends from anchor 21 and is folded back through guide 31 located at the upper left side of seat 26 and through tongue plate 13. Accordingly, the seated driver is able to use this system as a three point seat belt system as shown in FIG. 6.

Furthermore, it is clear that the belts 11 and 12 could also be retracted by separate retractors in this second embodiment.

Referring to FIG. 7, shown therein is a third embodiment of a seat belt system. In FIG. 7 the seat belt system 40 has similar elements as the above described second embodiment and the lap belt 11 is arranged in substantially the same manner as in the second embodiment. The shoulder belt 12, however, is anchored by means of an anchor 21 near the top of the door 16 on the opposite side of the door from the hinge and is retracted by a retractor 41 which is used only for the shoulder belt 12 which is fastened to seat 26 near the anchor 17 of the lap belt 11. In this third embodiment, unlike the tongue plate in the previously described embodiment, the tongue plate 13 is designed such that only the lap belt 11 is free to slide. In operation, when the driver closes the door 16 after sitting in the seat, the anchor 21 of the shoulder belt 12 is positioned above the right side of the seat 26 and the other end of shoulder belt 12 is retracted by the retractor 41 so that the driver is automatically fitted with a closely adhering diagonal loop. Furthermore, when the driver engages the tongue plate 13 with the buckle 14, the lap belt 11 adheres closely to the driver's lap to form a three belt seat belt system in combination with the shoulder belt 12.

In this third embodiment, if the lap belt 11 and the shoulder belt 12 are formed by a single continuous belt, the belt must be anchored at an intermediate point to the lower left side of the seat 26 and folded back through a ring 42 which allows free passage of the web (as shown in FIG. 8) and the same effect that was obtained by means of the embodiment of FIG. 7 can be obtained with only a single retractor 19.

As described above, the seat belt system of the present invention provides several superior results. First, the useability and handling characteristics of the seat belt system are improved and secondly, the use of the system by a driver and/or passenger is increased due to the fact that the system is semi-mandatory.

It should be apparent to one skilled in the art that in each of the above described embodiments, the same effect could also be obtained by reversing the positions of the retractors 19 and the anchors 17 and 21. In particular, by installing the anchors in the positions of the retractor 19 and installing retractors in the position of the anchors 17 and 21 so that the belts extend obliquely forward from one side of the driver and/or passenger to the other.

In all cases it is understood that the above described embodiments are merely illustrative of but a few of the many possible specific embodiments which represent the application of the principles of the present invention. It should be apparent to one skilled in the art that numerous and various other arrangements can be readily devised in accordance with these principles without departing from the spirit and scope of the invention.

I claim:

1. A seat belt system for a motor vehicle comprising:
   a lap restraining belt anchored at one end to adjacencies of a rear bottom portion of a seat of said motor vehicle and adjacent a center line of said vehicle;
   a shoulder restraining belt anchored to adjacencies of said anchored end of said lap belt and extending over a top portion of said seat;
   a retractor for retracting said lap and shoulder belts, said retractor being provided forward of said seat and adjacent a door of said motor vehicle such that said lap and shoulder belts extend obliquely from one side of said seat to the other side of said seat;

a tongue plate coupled to said lap and shoulder belts; and a buckle provided adjacent said door and to the rear of said seat for engagement with said tongue plate whereby a driver is prevented from operating said vehicle when said seat belt system is not in use.

2. A seat belt system for a moter vehicle comprising:

a lap restraining belt anchored at one end to adjacencies of a center line of said vehicle and a rear bottom portion of a seat of said vehicle;

a first retractor for retracting said lap belt, said first retractor being provided forward of said seat and adjacent a door of said vehicle such that said lap belt extends from one side of said seat to the other;

a shoulder restraining belt anchored at one end to an upper rear portion of said door;

a second retractor for retracting said shoulder belt, said second retractor being provided adjacent said anchored end of said lap belt;

a tongue plate coupled to said lap belt; and a buckle provided adjacent said door and a rear portion of said seat whereby a driver is prevented from operating said vehicle when said seat belt system is not in use.

3. A seat belt system for a motor vehicle comprising:

at least one seat belt obliquely extending from one side of a seat to a point forward of an other side of said seat, said seat belt being anchored at one end adjacent the rear portion of said seat along the center line of said vehicle;

a retractor for attracting said seat belt, said retractor being provided forward of said seat and adjacent a door opening of said vehicle such that said seat belt extends obliquely from one side of said seat to the other side;

a tongue plate coupled to said seat belt; and a buckle provided adjacent a rear portion of said seat and adjacent said door opening of said vehicle whereby a driver is prevented from operating said vehicle when said seat belt system is not in use.

4. A seat belt system according to claim 3 wherein there are two seat belts.

5. A seat belt system according to claim 4 wherein said tongue plate has two slits through which said two seat belts slide.

* * * * *